United States Patent
Ishikawa et al.

(10) Patent No.: US 6,396,634 B1
(45) Date of Patent: May 28, 2002

(54) SURFACE LIGHT SOURCE DEVICE OF SIDE LIGHT TYPE

(75) Inventors: Tsuyoshi Ishikawa, Tokyo; Nobuhisa Noguchi, Ohmiya, both of (JP)

(73) Assignees: Enplas Corporation, Kawaguchi; Yasuhiiro Koike, Yokohama, both of (JP)

( * ) Notice: Subject to any disclaimer, the term of this patent is extended or adjusted under 35 U.S.C. 154(b) by 0 days.

(21) Appl. No.: 08/801,805

(22) Filed: Feb. 14, 1997

(30) Foreign Application Priority Data

Feb. 20, 1996 (JP) .............................. 8-056829

(51) Int. Cl.[7] ................................ G02B 5/02
(52) U.S. Cl. ................ 359/599; 359/707; 362/31; 349/64
(58) Field of Search ............... 359/599, 707; 362/31–32; 349/48–50, 63–65

(56) References Cited

U.S. PATENT DOCUMENTS

| | | | | |
|---|---|---|---|---|
| 4,617,245 A | * | 10/1986 | Tanaka et al. | 430/58 |
| 4,737,896 A | * | 4/1988 | Mochizuki et al. | 349/64 |
| 4,948,690 A | * | 8/1990 | Hisamura et al. | 430/60 |
| 5,123,077 A | * | 6/1992 | Endo et al. | 385/129 |
| 5,384,658 A | * | 1/1995 | Ohtake et al. | 359/599 |

FOREIGN PATENT DOCUMENTS

EP 544332 A1 * 6/1993 .................. 349/64

* cited by examiner

*Primary Examiner*—Thong Nguyen
(74) *Attorney, Agent, or Firm*—Staas & Halsey LLP

(57) ABSTRACT

A light control member formed by a prism sheet 5 is arranged along an emitting surface 12 of a light guide plate of a side light type surface light source device for liquid-crystal display backlighting arrangement and the like. The prism sheet 5 is provided with numerous projections formed with a height H1 at a pitch W1 D1. Roughness is imparted to the emitting surface 12 by matt-processing or adhesion of fine particles. The roughness is preferably within the arithmetic average roughness Ra range 0.02–0.25 $\mu$m. Non-uniformity may be applied to height H1 of the prism sheet 5. The tendency of the prism sheet to adhere to the emitting surface is reduced and degradation of light quality prevented by the roughness of the emitting surface and/or non-uniform height of projections on the prism sheet.

5 Claims, 5 Drawing Sheets

SURFACE LIGHT SOURCE DEVICE OF SIDE LIGHT TYPE

BACKGROUND

1. Field of Invention

The present invention relates to a side light type light source device for use with a liquid-crystal display or the like, and more particularly to a side light type surface light source device that employs a light guide plate having emitting directivity.

2. Related Art

Side light type surface light source devices have a thin structure and have previously have been applied to backlighting of liquid-crystal display panels and the like.

A side light type surface light source device is equipped with a light guide plate, and a rod-shaped light source (primary light source) such as a cold-cathode tube arranged along an edge of the light guide plate. Light emitted by the primary light source is introduced through an edge of the light guide plate into the light guide plate. The light introduced into the light guide plate is deflected and output from one face of the light guide plate to illuminate, for example, a liquid-crystal panel.

Light guide plates employed in side light type surface light source devices are classified basically into two types by shape. One of these types of light guide plate has a substantially uniform thickness, while the other type of light guide plate has a thickness that has a tendency to decrease gradually from one edge. It is known that the latter type can emit light generally more efficiently than the former type.

FIG. 6 is an exploded perspective view showing a general configuration of a side light type surface light source device of the latter type. With reference to FIG. 6, a side light type surface light source device 1 is provided with a light scattering guide plate 2 (a light guide plate made of a light scattering and guiding material), and a primary light source 3 disposed at the side of the light scattering guide plate 2. The light scattering guide plate 2 is in a lamination arrangement with a reflection sheet 4 and a light control member comprised by a prism sheet 5. The primary light source 3 includes for example a cold-cathode tube (fluorescent lamp) 6 and a reflection member (reflector) 7 with a semicircular cross-section facing a portion of the circumference of the cold-cathode tube (fluorescent lamp) 6. Light radiating from the cold-cathode tube (fluorescent lamp) 6 impinges onto the edge surface (hereinafter referred to as the "incident surface") of the light scattering guide plate 2 from the open portion of the reflector 7.

The reflection sheet 4 is a sheet-shaped regular reflection member formed of gold foil or the like, or a sheet-shaped irregular reflection member formed of white PET film or the like.

The light scattering guide plate 2 has a wedge-shaped cross-section. The material of the light scattering guide plate 2 is obtained by uniformly distributing light-permeable fine particles, for example, in a polymethylmethacrylate (PMMA) matrix having a different refractive index from that of the light-permeable fine particles.

FIGS. 7A and 7B are cross-sectional views along line A—A of FIG. 6, and also show the light path that explains the behavior of the light. With reference to FIG. 7A, light L from the primary light source 3 is guided into the light scattering guide plate 2 from the incident surface T. The light-permeable fine particles distributed in the light scattering guide plate 2 scatter the light L. When an irregular reflection member is employed as for the reflection sheet 4, a portion of the light is also scattered by the reflection sheet 4.

The light L is thus subjected to this scattering and nears the tip of the light scattering guide plate 2 as it is reflected between the surface on the reflection sheet 4 side (hereinafter referred to as the "sloping surface") and the surface on the prism sheet 5 side (hereinafter referred to as the "emitting surface").

In this propagation process the angle of incidence of the light L relative to the emitting surface is reduced little by little each time the light L is reflected by the sloping surface. Components satisfying the condition of being at or below the critical angle relative to the emitting surface exit from the emitting surface. Based on the above-described scattering, light L1 exiting from the emitting surface, as shown in FIG. 7B, has scattering light properties. However, light L1 does not propagate in perfectly random directions, but has a preferential propagation direction.

As shown in FIG. 7B, this preferential propagation direction is inclined toward the tip of the wedge relative to the emitting surface. In other words, light L1 emitted from the light guide plate has directivity, whereby emitting directivity is imparted to the side light type surface light source device 1.

Prism sheet 5 is arranged to correct this directivity. Prism sheet 5 is formed of light-permeable sheet material such as polycarbonate, with the prism surface facing the light scattering guide plate 2 (i.e. inwardly). The prism surface is comprised of numerous triangular-cross-section projections extending substantially parallel to the incident surface T of the light scattering guide plate 2. The sloping surfaces of these triangular projections correct the principal emission direction of the light. L1 (i.e. preferential propagation direction) to the front of the emission surface.

The prism sheet 5 may be a double-sided prism sheet. A double-sided prism sheet is one that has another prism surface on the side opposite to the light scattering guide plate 2 side (outside surface). The grooves on the outside prism surface are substantially at right-angles to the grooves on the inside prism surface. A surface light source device 1 that employs these prism sheets emits light to the front with good efficiency, compared with side light type surface light source devices that employ a light guide plate of substantially uniform thickness.

Light guide plates having emitting directivity include wedge-shaped or nearly wedge-shaped light guide plates comprised of a transparent or semi-transparent material, and flat-plate-shaped light guide plates having a scattering film or the like on the emitting surface, or on the reverse surface, or on both surfaces. A side light type surface light source device that employs a plate such as these also is able to emit light to the front with good efficiency.

The present inventors observed that if this type of side light type surface light source device is placed in a high-temperature environment for a long time, various patterns appear on the prism sheet 5 (that is, on the illuminant surface of the side light type surface light source device), as shown in FIG. 8. This phenomenon can be explained as follows.

When a prism sheet 5 is exposed to a high-temperature environment for a long time, the prism sheet 5 tends to exhibit local adhesion to the emitting surface of the light scattering guide plate 2. In regions where the prism sheet 5 adheres to the emitting surface, the layer of air between the prism sheet 5 and the emitting surface is lost. This results in disturbances in the thickness distribution of the air layer, thereby providing the pattern appearance.

Island-shaped patterns C as shown in FIG. 8 appear when the prism sheet 5 adheres to areas of the emitting surface of the light scattering guide plate 2. Spot adhesions of the prism sheet 5 to the emitting surface of the light scattering guide plate 2 gives rise to a pattern of spots D. These patterns degrade the quality of the surface light source device's light. Further, when applied to a liquid-crystal display backlighting arrangement, it degrades the quality of the display screen.

OBJECT AND SUMMARY OF THE INVENTION

The aim of the present invention is to resolve the above problems of the prior art. The object of the present invention is to provide a side light type surface light source device that can prevent adhesion of a light control member such as a prism sheet to the emitting surface, thereby avoiding reduction in illumination light quality.

In accordance with this invention, means to prevent adhesion between the emitting surface of the light guide plate and a plate-shaped control member used in the side light type surface light source device is applied to at least one of the light guide plate emitting surface and the light control member.

The adhesion prevention means applied to the emitting surface is embodied as an emitting surface having a roughness that does not disorder the emitted light. The emitting surface roughness may be provided by roughening the emitting surface itself or by adhering numerous fine particles to the emitting surface.

The adhesion prevention means applied to the light control member is embodied as providing the light control member with projections having various heights, thereby effectively avoiding the light control member from adhesion.

The roughness imparted to the emitting surface preferably within arithmetic average roughness Ra range from 0.02 to 0.25 µm. Such a roughness may be applied by roughening the emitting surface itself or by adhering numerous fine particles to the emitting surface.

In accordance with this invention, the roughness of the emitting surface holds diffusion of emitted light to within a range that is small enough for practical purposes, maintaining the directivity of the emitted light. Providing such a roughness on the emitting surface effectively prevents adhesion by lowering the affinity between the light control member and the emitting surface.

A light control member with projections of various heights causes the space between each projection and the emitting surface to vary accordingly. The result is that affinity between light control member and emitting surface is lowered, effectively preventing adhesion. This technique does not reduce emitted light directivity.

The invention will now be described in further detail with reference to the accompanying drawings.

PREFERRED EMBODIMENTS

First Embodiment

Figure 1:
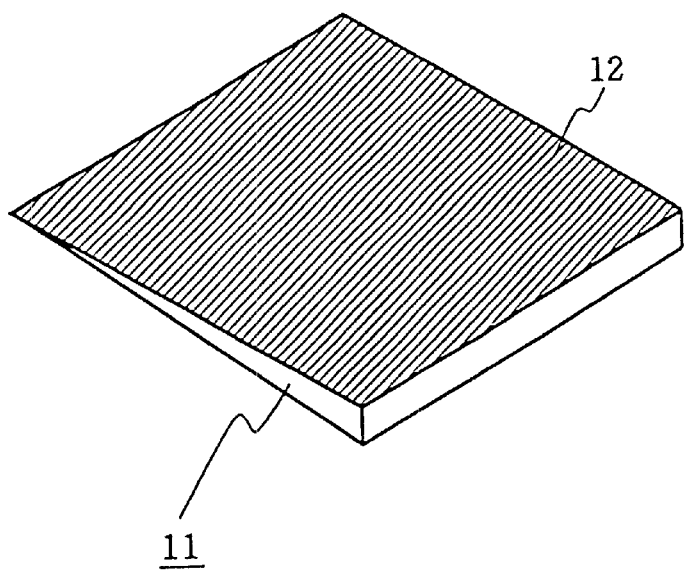
FIG. 1 a perspective view of a light scattering guide plate used in a side light type surface light source device according to the first embodiment of the present invention.
Figure 6:
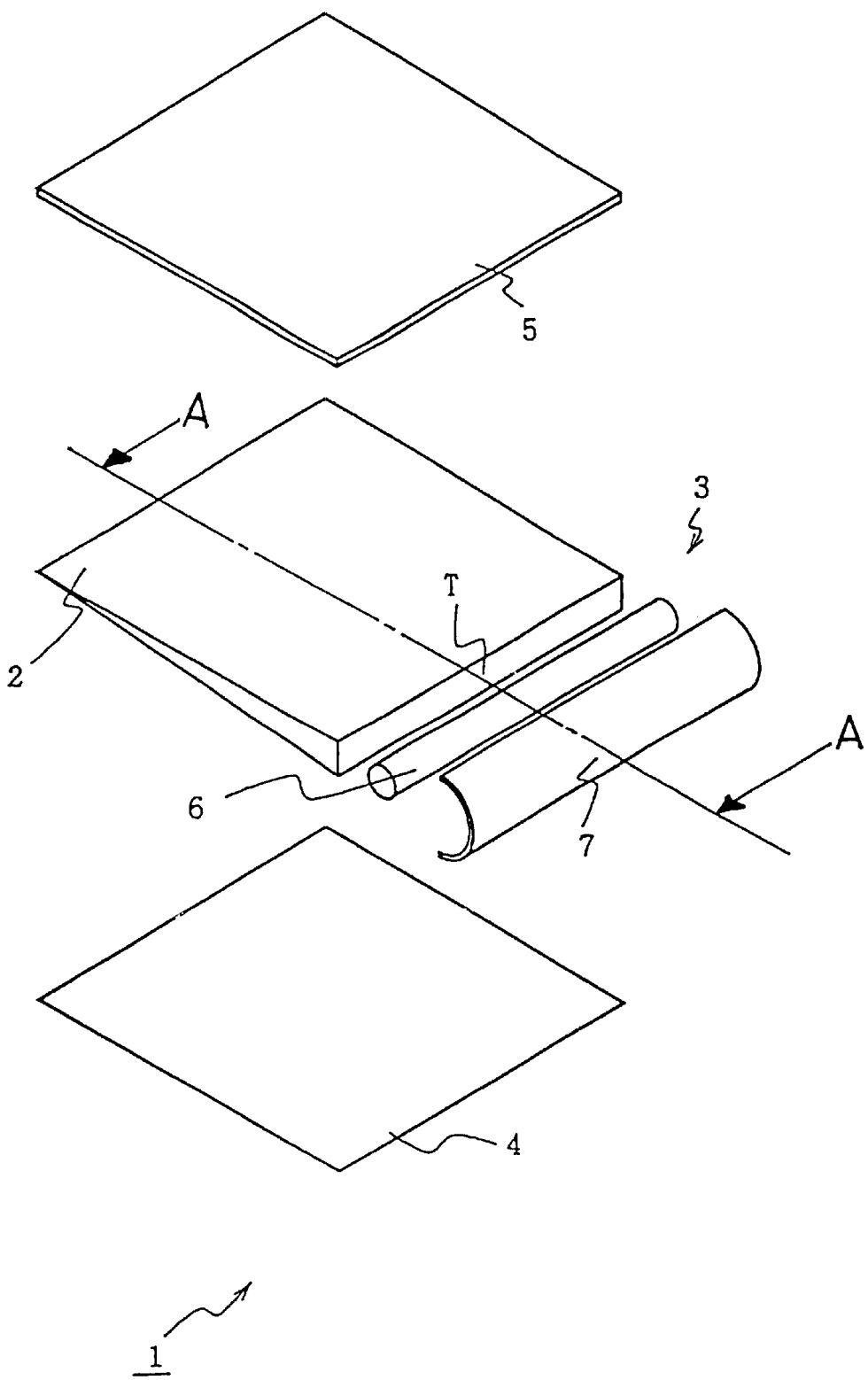
FIG. 6 an exploded perspective view of a conventional side light type surface light source device.
Figures 7A, 7B:
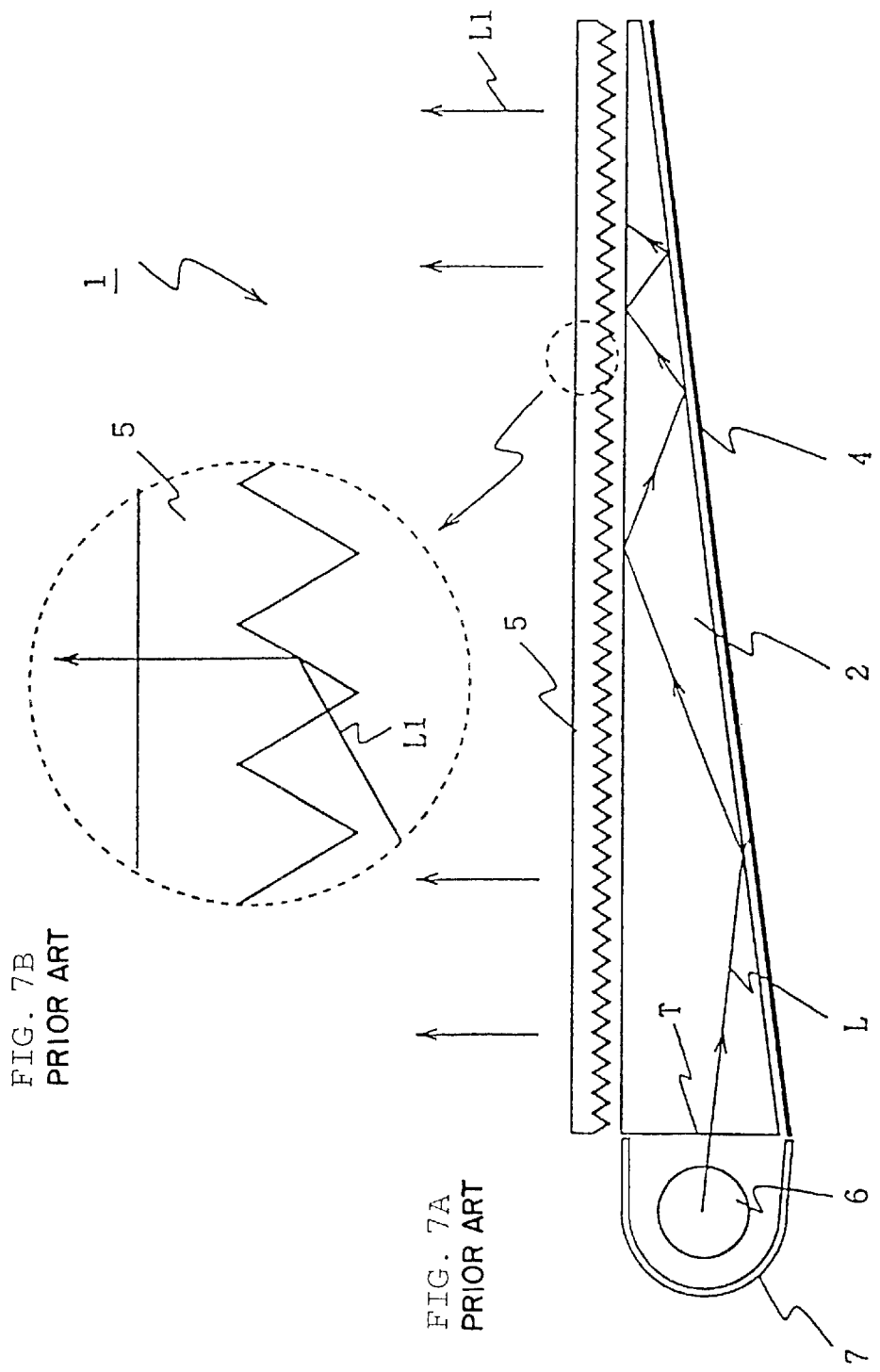
FIG. 7A and 7B are cross-sectional views along line A—A of FIG. 6.

FIG. 1 is a perspective view of a light scattering guide plate used in a side light type surface light source device according to the first embodiment of the present invention. Except for the light scattering guide plate 11, this side light type surface light source device is the same as the side light type surface light source device described with reference to FIGS. 6 and 7, repeated explanation being omitted.

With reference to FIG. 1, emitting surface 12 of the light scattering guide plate 11 is provided with a matt surface (granular surface) formed by mattprocessing. The arithmetic average roughness Ra of the emitting surface (matt surface) 12 is within the range from 0.02 to 0.25 µm. Arithmetic average roughness Ra is a unit of surface roughness specified by JIS B0031-1994.

The roughness imparted to emitting surface 12 effectively prevents the prism sheet 5 disposed closely along the emitting surface 12 from adhering to the emitting surface 12.

Figure 2:
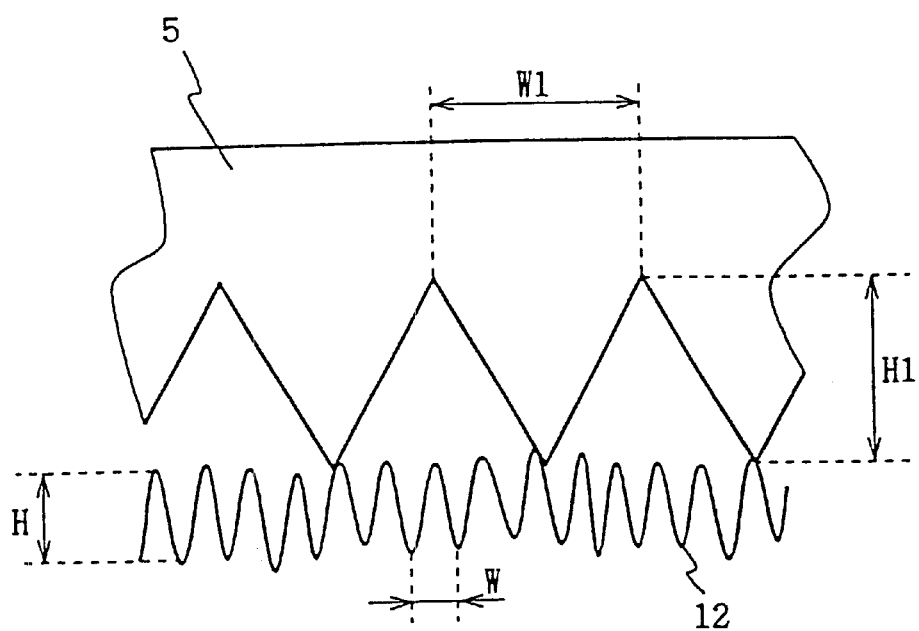
FIG. 2 is an enlarged cross-sectional view of the emitting surface of the light scattering guide plate of FIG. 1.

FIG. 2 is an enlarged cross-sectional view showing the relationship between the prism sheet 5 and the emitting surface 12. The prism sheet 5 is formed of polycarbonate. The projections each have a triangular cross-section, a height H1 within the range from 20 to 40 µm and a repetition pitch W1 of 50 µm. On the other hand, emitting surface 12 is provided with roughness imparted by matt-processing to roughen the surface. The roughness has a depth H in a range from 0.05 to 0.2 µm and an average pitch W in a range from 5 to 40 µm.

In accordance with this structure, contact between emitting surface 12 and prism sheet 5 is via the projecting portions of the surface roughness. As a result, affinity (tendency to adhere) between prism sheet 5 and emitting surface 12 is greatly reduced compared with an emitting surface 12 having no roughness.

It should be noted that the roughened emitting surface 12 may possibly scatter the emitted light and reduce its directivity.

Figure 3:
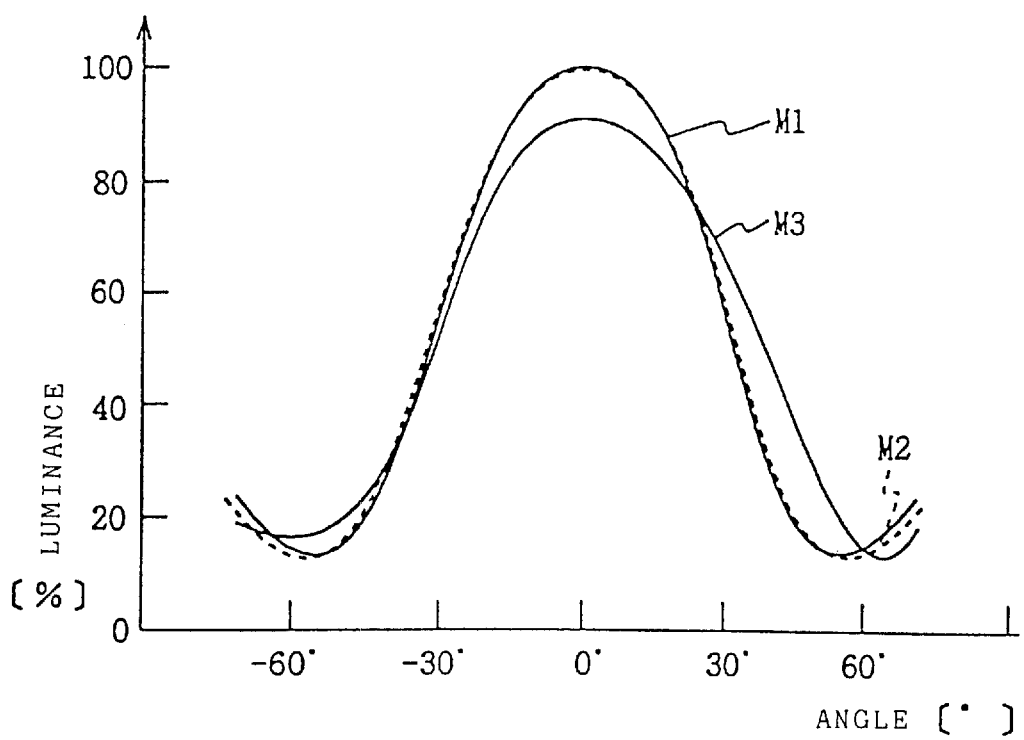
FIG. 3 is a graph illustrating emitting directivity of the light scattering guide of FIG. 1.

FIG. 3 is a graph of characteristic curves illustrating the emitting directivity of the light scattering guide plate of FIG. 1. In the graph the horizontal axis represents the angle of emission and the vertical axis represents luminance. An angle of zero degrees corresponds to the frontal direction (perpendicular to the emitting surface), and a plus sign denotes directions inclined toward the tip of the wedge shape.

Curve M1 shows the characteristics obtained when the emitting surface is a mirror surface; curve M2 is for an emitting surface with an arithmetic average roughness Ra of 0.2 µm, and curve M3 is for an emitting surface has an arithmetic average roughness Ra of 0.3 µm. It is seen from these curves that curve M2 hardly shows decrease in emitting directivity compared with M1 while curve M3 shows a remarkable decrease in emitting directivity. The peak (frontal luminance) of curve M3 is approximately 10% lower than the peak (frontal luminance) of curve M1.

Figure 4:
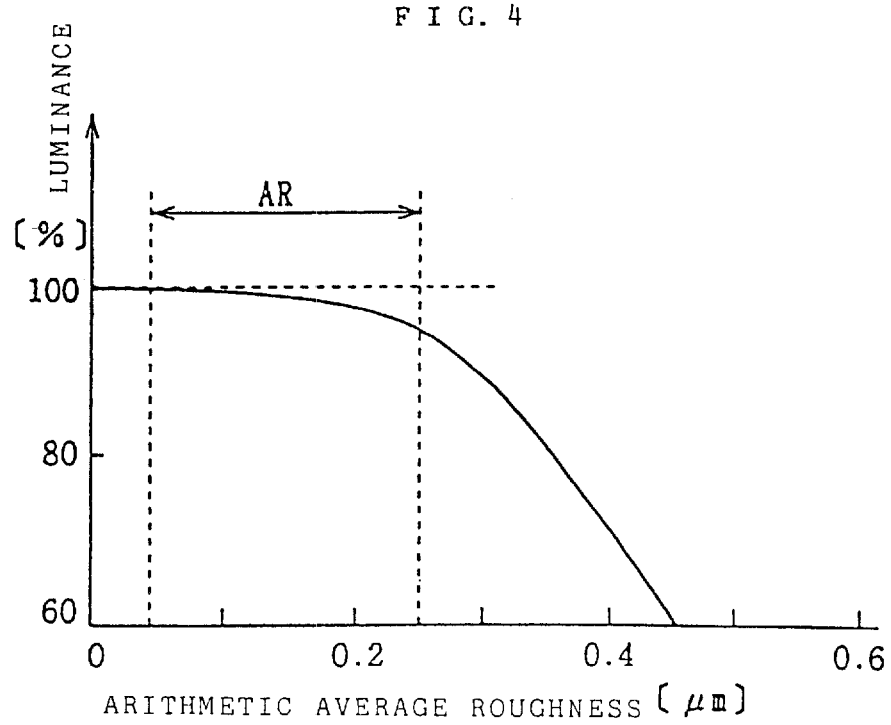
FIG. 4 is a graph of curves representing light scattering guide plate characteristics depending on roughness as parameter.

In order to compare peaks with respect to other roughnesses, luminance was measured perpendicular to the emitting surface with arithmetic average roughness Ra as a parameter and the graph of FIG. 4 was obtained. The horizontal axis is roughness Ra and the vertical axis luminance peak value.

The graph shows that an arithmetic average roughness Ra of 0.25 µm or more out of a range indicated by AR in FIG. 4, provides rapid reduction in directivity and frontal luminance level. Such a striking decrease in directivity is undesirable for practical use.

The inventors left a surface light source device 1 incorporating a prism sheet 5 and light scattering guide plates provided with different roughnesses for 1000 hours in an environment with a temperature of 70 degrees (°C.) and a humidity of 20%, and then checked them for adhesion of the prism sheet 5. It was found that the divide between adhesion and non-adhesion was at an arithmetic average roughness Ra of 0.02 µm and adhesion arises in the case of an emitting surface having a roughness closer to a mirror surface (low roughness) than that value while no adhesion arises under such roughness as greater than that value.

Based on the above, an actual preferred condition for the emitting surface to effectively prevent adhesion of the prism sheet 5 without degradation of directivity is within an arithmetic average roughness Ra range of from 0.02 to 0.25 µm.

Second embodiment

Figure 5:
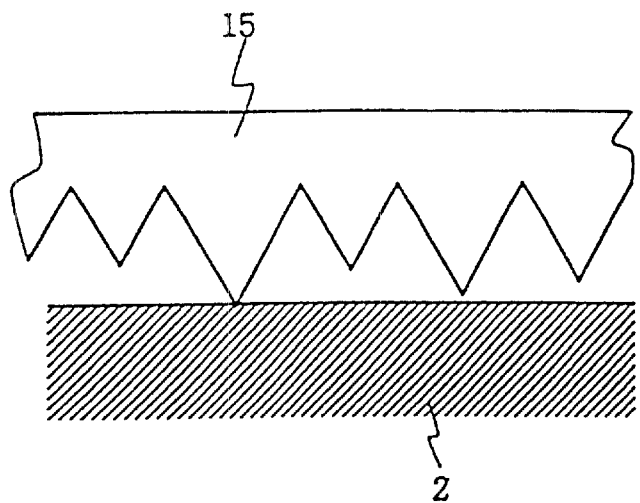
FIG. 5 is an enlarged cross-sectional view of the emitting surface of a side light type surface light source device according to the second embodiment of the invention.
Figure 8:
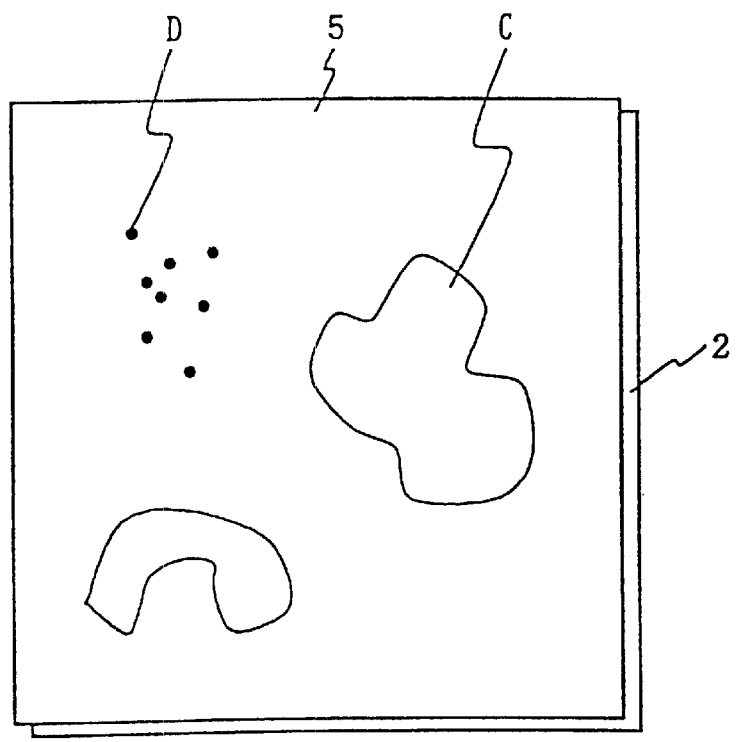
FIG. 8 is a front view of a side light type surface light source device for explaining adhesion of the prism sheet on the emitting surface.

FIG. 5 is an enlarged cross-sectional view of the emitting surface of a side light type surface light source device according to the second embodiment of the invention. Except for the prism sheet 15 as a light control member, this side light type surface light source device is the same as the side light type surface light source device described with reference to FIGS. 6 and 7, repeated explanation being omitted.

With reference to FIG. 5, the prism sheet 15 is formed of polycarbonate and is provided with numerous rows of projections having a triangular cross-section. It should be noted that height variation is given to these projections. This non-uniformity lowers the affinity (tendency to adhere) between prism sheet 15 and emitting surface 12, effectively preventing adhesion of the prism sheet 15 to the emitting surface without lowering the directivity of the scattering light.

The height variation of the projections on the prism sheet 15 may be based on a non-regular height distribution or on a regular height distribution in which various heights are included.

Modifications of embodiments

The roughness of the emitting surface 12 of the light scattering guide plate 11 in the first embodiment described above may be applied by a means other than matt-processing. For example, sand-blasting or chemical etching may be used to effect the roughening.

The light scattering guide plate 11 with roughness does not always require the emitting surface 12 itself. The emitting surface 12 may, for example, be roughened by adhering many fine particles to the emitting surface 12 to be roughened. Adhesion of the fine particles may be effected by, for example, printing ink containing fine particles on the emitting surface. The fine particles are preferably transparent, and preferably not larger than 30 µm in diameter. The emitting surface 12 produced by the adhesion of fine particles, as in the case in which matt-processing is used, preferably has an arithmetic average roughness Ra in the range from 0.02 to 0.25 µm.

The first and second embodiments can be used in combination to impart roughness to the emitting surface 12 and non-uniform heights to the prism sheet projections. It will probably be readily understood from the preceding explanation that such an arrangement will further enhance the effective prevention of prism sheet adhesion.

Prisms may be provided on both sides of the prism sheets 5 and 15 used as the light control member.

While it is preferable to use a light scattering guide plate with a wedge-shaped cross-section, a flat plate can also be applied to the invention.

In the arrangements of the first and second embodiments, light is supplied to the light scattering guide plate from one end, but this may be modified. For example, light may be supplied by arranging a light source such as light source 3 (see FIG. 1) along both ends of the light scattering guide plate.

It should be noted that the application of the surface light source device of this invention is not limited to liquid-crystal display backlighting arrangements but may also be applied to the lighting arrangements of various other lighting devices, display devices and the like.

What is claimed is:

1. A side light type surface light source device comprising:
    a light guide plate,
    a light source that supplies light inside the light guide plate via an edge surface of the light guide plate, and
    a sheet-shaped light control member disposed closely along an emitting surface emitting light having directivity from the light guide plate and has a function of correcting the directivity;
    wherein a roughness is applied to the light guide plate emitting surface to prevent the light control member from adhering to the emitting surface without losing the directivity of light emitted from the emitting surface.

2. A side light type surface light source device according to claim 1, wherein roughness imparted to the light guide plate emitting surface is within an arithmetic average roughness Ra from range 0.02 to 0.25 µm.

3. A side light type surface light source device according to claim 1 or claim 2, wherein roughness is imparted to the light guide plate emitting surface by roughening the emitting surface itself.

4. A side light type surface light source device according to claim 1 or claim 2, wherein roughness is imparted to the light guide plate emitting surface by adhering numerous tine particles to the emitting surface.

5. A side light type surface light source device comprising:
    a sheet-shaped light control member disposed closely along an emitting surface emitting light having directivity and functioning to correct directivity of the emitted light;
    wherein a roughness is applied to the emitting surface to prevent the light control member from adhering to the emitting surface without losing the directivity of light emitted from the emitting surface.

* * * * *

UNITED STATES PATENT AND TRADEMARK OFFICE
CERTIFICATE OF CORRECTION

PATENT NO. : 6,396,634 B1
DATED : May 28, 2002
INVENTOR(S) : Tsuyoshi Ishikawa et al.

It is certified that error appears in the above-identified patent and that said Letters Patent is hereby corrected as shown below:

Title page,
Item [57], ABSTRACT,
Line 6, delete "W1".

Column 1,
Line 14, delete "have" (second occurrence).

Signed and Sealed this

Thirtieth Day of July, 2002

*Attest:*

JAMES E. ROGAN
*Director of the United States Patent and Trademark Office*

*Attesting Officer*

UNITED STATES PATENT AND TRADEMARK OFFICE
CERTIFICATE OF CORRECTION

PATENT NO.    : 6,396,634 B1
DATED         : May 28, 2002
INVENTOR(S)   : Ishikawa et al.

Page 1 of 1

It is certified that error appears in the above-identified patent and that said Letters Patent is hereby corrected as shown below:

<u>Title page,</u>
Item [*] Notice, delete "0" and insert -- 626 --.

Signed and Sealed this

Thirtieth Day of August, 2005

JON W. DUDAS
*Director of the United States Patent and Trademark Office*